US011878483B2

(12) United States Patent
Leblanc (10) Patent No.: US 11,878,483 B2
(45) Date of Patent: Jan. 23, 2024

(54) FACILITY AND METHOD FOR MANUFACTURING REINFORCING PLIES WITH A DEVICE FOR TURNING OVER STRIPS WHILE FLAT

(71) Applicant: Compagnie Generale Des Etablissements Michelin, Clermont-Ferrand (FR)

(72) Inventor: Dominique Leblanc, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 615 days.

(21) Appl. No.: 17/054,316

(22) PCT Filed: May 16, 2019

(86) PCT No.: PCT/FR2019/051117
§ 371 (c)(1),
(2) Date: Nov. 10, 2020

(87) PCT Pub. No.: WO2019/220061
PCT Pub. Date: Nov. 21, 2019

(65) Prior Publication Data
US 2021/0078273 A1    Mar. 18, 2021

(30) Foreign Application Priority Data
May 17, 2018  (FR) ...................................... 1854128

(51) Int. Cl.
*B29D 30/70*    (2006.01)
*B29D 30/42*    (2006.01)
(Continued)

(52) U.S. Cl.
CPC ............. *B29D 30/70* (2013.01); *B29D 30/42* (2013.01); *B65G 47/252* (2013.01);
(Continued)

(58) Field of Classification Search
CPC ...... B29D 2030/705; B29C 2793/0072; B29C 66/1142; B65G 47/252
See application file for complete search history.

(56) References Cited

U.S. PATENT DOCUMENTS 4,923,554 A    5/1990  Ozawa
6,355,126 B1 *  3/2002  Ogawa ............... B29D 30/1657
                                                156/123
(Continued)

FOREIGN PATENT DOCUMENTS

CN    105905573 A    8/2016
EP    0434404 A2    6/1991
(Continued)

*Primary Examiner* — Scott W Dodds
(74) *Attorney, Agent, or Firm* — Dickinson Wright PLLC (57) ABSTRACT

The installation comprises a preparation station for preparing strips by cutting a straight wire band, a jointing station arranged to butt-joint the strips obtained from the preparation station so as to form a reinforcing ply, and a station for turning over strips, which is interposed between the preparation station and the jointing station. The installation also comprises a first receiving surface, arranged to receive a strip, a second receiving surface associated with a reversing device which is arranged to transfer a strip from said first receiving surface to said second receiving surface, by thus turning over the strip. A gripping member is arranged to take a strip from the first or second receiving surface in order to allow the jointing station to selectively construct a reinforcing ply with a left-hand ply handle or with a right-hand ply angle.

11 Claims, 5 Drawing Sheets

(51) Int. Cl.
*B65G 47/252* (2006.01)
*B29C 65/00* (2006.01)

(52) U.S. Cl.
CPC ... *B29C 66/1142* (2013.01); *B29C 2793/0072* (2013.01); *B29D 2030/422* (2013.01); *B29D 2030/427* (2013.01); *B29D 2030/705* (2013.01)

(56) References Cited

U.S. PATENT DOCUMENTS

| | | | |
|---|---|---|---|
| 2001/0030103 A1 | 10/2001 | Runonen | |
| 2004/0011454 A1* | 1/2004 | Mancini | B29D 30/3007 156/907 |
| 2013/0205590 A1* | 8/2013 | Grashuis | B29D 30/42 29/894.37 |

FOREIGN PATENT DOCUMENTS

| | | |
|---|---|---|
| EP | 0956940 A1 | 11/1999 |
| SE | 184197 C1 | 7/1954 |
| WO | 0200421 A1 | 1/2002 |

* cited by examiner

FACILITY AND METHOD FOR MANUFACTURING REINFORCING PLIES WITH A DEVICE FOR TURNING OVER STRIPS WHILE FLAT

CROSS-REFERENCE TO RELATED APPLICATION

This application claims priority to and the benefit of PCT Patent Application No. PCT/FR2019/051117, filed on May 16, 2019, entitled "FACILITY AND METHOD FOR MANUFACTURING TREAD-REINFORCING BREAKER PLIES WITH A DEVICE FOR TURNING OVER BEAD FLIPPERS WHILE FLAT," and French Patent Application No. 1854128, filed on May 17, 2018, entitled "FACILITY AND METHOD FOR MANUFACTURING TREAD-REINFORCING BREAKER PLIES WITH A DEVICE FOR TURNING OVER BEAD FLIPPERS WHILE FLAT".

BACKGROUND OF THE INVENTION

1. Field of the Invention

The present disclosure relates to the field of the manufacture of reinforcing plies intended to be used in the structure of tires, notably pneumatic tires for vehicles.

The present disclosure relates more particularly to the production of such plies by butt-jointing strips.

2. Related Art

It is in fact known practice to produce the reinforcing plies by first of all producing, for example by calendering, a continuous band, called "straight wire ply" or "straight wire band", which comprises a plurality of continuous reinforcing wires which are oriented parallel to the longitudinal direction of said band and which are embedded in a rubber, then by cutting from this straight wire band, by means of a cutter, according to a predetermined cutting angle, sections of straight wire band called "strips" or "widths", then by pairwise butt-jointing said strips by their selvedges, parallel to the reinforcing wires, for example by successively depositing said strips on an assembly belt, so as to finally construct a reinforcing ply within which the reinforcing wires form, relative to the longitudinal direction of said reinforcing ply, an angle, called "ply angle", which results from the chosen cutting angle.

It is also known practice to use, to form the crown reinforcers of a pneumatic tire, two crossed reinforcing plies, by radially superposing two reinforcing plies which each have a ply angle different from that of the other reinforcing ply, and for example a ply angle with a value opposite the ply angle of the other reinforcing ply.

To manufacture a tire, it is therefore necessary, in practice, to separately produce at least two different reinforcing ply models, including at least one first ply model which has a ply angle oriented in a first direction relative to the longitudinal direction of the reinforcing ply, that is by convention designated as being a "left-hand" ply angle, and at least one second ply model which has a ply angle oriented in a second direction opposite the first, here, by convention, "right-hand".

In some situations, and notably when the installation for manufacturing reinforcing plies uses a cutter whose range of cutting angle adjustment is too limited to allow a complete reversal of the cutting angle, it is consequently necessary to duplicate all or some of the equipment, and in particular to provide at least two cutters, in order to have, on the one hand, a first manufacturing station for producing the reinforcing plies with left-hand ply angle, and, on the other hand, a second manufacturing station to produce the reinforcing plies with right-hand ply angle.

This naturally increases the bulk and the overall cost of the installation, as well as the associated operating and maintenance costs.

Conversely, it is possible to envisage equipping the installation with a cutter whose range of adjustment is sufficiently wide to be able to alternately select a first cutting angle, according to which a series of strips intended for the production of a ply with left-hand angle can be produced, then a second cutting angle of opposite sign, according to which a series of strips intended for the production of a ply with right-hand angle can be produced.

However, such an installation can also present certain drawbacks.

In fact, on each reconfiguration of the cutter to select anew cutting angle, an offcut from the straight wire band is generated, which results in a loss of raw material.

Furthermore, the proliferation of reconfigurations of the cutter, on each change of the direction of orientation of the cutting angle, according to the desired ply angle, tends on the one hand to increase the cycle time required for the production of the reinforcing plies, and, on the other hand, to provoke wear and play in the cutter mechanism, which can thus lose accuracy over time, and require more frequent maintenance.

Such drawbacks can be prejudicial, particularly when aiming for the mass production of varied reinforcing plies.

SUMMARY OF THE INVENTION AND ADVANTAGES

The objects assigned to the disclosure consequently aim to remedy the abovementioned drawbacks and propose an installation for manufacturing reinforcing plies which is multipurpose, so as to allow the production of all the reinforcing plies needed to obtain a crossed reinforcing structure, while being relatively compact, robust, reliable, and economical in terms of raw material.

The objects assigned to the disclosure are achieved by means of an installation for manufacturing a reinforcing ply, said installation comprising:
  a preparation station which is arranged to prepare strips by cutting a band called "straight wire band" which is formed by a plurality of reinforcing wires which are embedded in at least one layer of rubber and which extend parallel to one another in the longitudinal direction of said straight wire band,
  a jointing station arranged to successively butt joint, by their selvedges, the strips obtained from the preparation station, so as to form a reinforcing ply,
  said installation being characterized in that it comprises a station for turning over strips, which is interposed between the preparation station and the jointing station and which comprises:
  a first receiving surface, arranged to receive a strip prepared by the preparation station and to hold said strip according to a first orientation in which said strip, which is delimited in thickness by a first face and by a second face opposite said first face, rests and is held on said first receiving surface by its second face, and presents its first face as visible face, a second receiving surface associated with a reversing device which is arranged to transfer a strip, initially placed and held on the first receiving surface, from said first receiving surface to said second receiving surface, thus turning over the strip so as to confer on said strip a second orientation, the reverse of the first orientation, in which said strip is held against the second receiving surface by its first face, and presents its second face as visible face, a gripping member arranged to take a strip selectively from the first receiving surface or from the second receiving surface in order to allow the jointing station to selectively construct a reinforcing ply from strips oriented in accordance with the first orientation or, respectively, in accordance with the second orientation.

Advantageously, the implementation of a station for turning over strips makes it possible to use one and the same preparation station, and one and the same jointing station, to produce, as required, reinforcing plies with left-hand ply angle or reinforcing plies with right-hand ply angle, which makes the installation highly versatile.

The turning over of the strip on itself preferably amounts to transferring the top face of the strip into bottom position and the bottom face of the strip into top position, preferably by a swivelling movement in roll motion about the longitudinal axis of said strip.

The turning over allows for a mirror-wise reversal of the bevel of the strip, wherein said bevel results from the cutting angle implemented by the cutter.

Thus, from one and the same configuration of the cutter which cuts a given strip format, it is possible to obtain, by choice, depending on whether said strip is used as such, without turning it over, or, on the contrary, said strip is turned over before being used, either a first model of strip for ply with left-hand ply angle, or a second model of strip for ply with right-hand ply angle, in which, because of the turning over, the right-hand ply angle has the same absolute value as the left-hand ply angle as initially cut, but of opposite sign.

It is not therefore necessary to reconfigure the cutter to produce symmetrical strips. The manufacturing process therefore gains in accuracy, and makes it possible to save energy as well as on maintenance operations.

Moreover, the use of receiving surfaces dedicated to the turning over, distinct from the assembly belt of the jointing station on which the strips are butt-jointed to form the reinforcing plies therein, advantageously makes it possible to effectively and very stably hold the strip during the turnover operation, and in particular to never totally let go of the strip between the moment when the cutter separates said strip from the straight wire band and the moment when this same strip, after having passed through the first receiving surface, following the cutting, and after having possibly being transferred onto the second receiving surface by being turned over, is taken from the receiving surface where it is located then is butt jointed to other strips already present on the assembly belt.

The strip is thus protected from being exposed to uncontrolled deformations, such as an elongation, a contraction, a folding, or a twisting, notably at the bevelled ends of said strip. Likewise, the accidental shifting of the strip relative to the machine reference frame of the jointing station is avoided.

Furthermore, the installation according to the disclosure advantageously makes it possible to perform the operations of preparation and of turning over of a strip in concurrent time, while transferring to the jointing station and butt jointing another strip which will have been previously prepared, and, if appropriate, turned over. It is thus possible to reduce the reinforcing ply production cycle time.

It will also be noted that the disclosure can advantageously, in some cases, be implemented by retrofitting on existing installations, simply by inserting a turning-over station between an existing preparation station and an existing jointing station.

BRIEF DESCRIPTION OF THE DRAWINGS

Other objects, features and advantages of the disclosure will become more apparent in detail on reading the following description, and using the attached drawings, supplied in a purely illustrative and nonlimiting manner, in which.

DETAILED DESCRIPTION OF THE ENABLING EMBODIMENTS

The present disclosure relates to an installation 1 for manufacturing a reinforcing ply 2.

Such a reinforcing ply 2 is intended to reinforce the structure of a tire 3, and more particularly of a tire 3 intended to be used on a rolling vehicle.

Such a tire 3 may be solid, or have cellular structure (typically for a puncture-proof wheel tire), or, preferably, may be a pneumatic tire, without departing from the scope of the disclosure.

Figures 9, 10, 11:
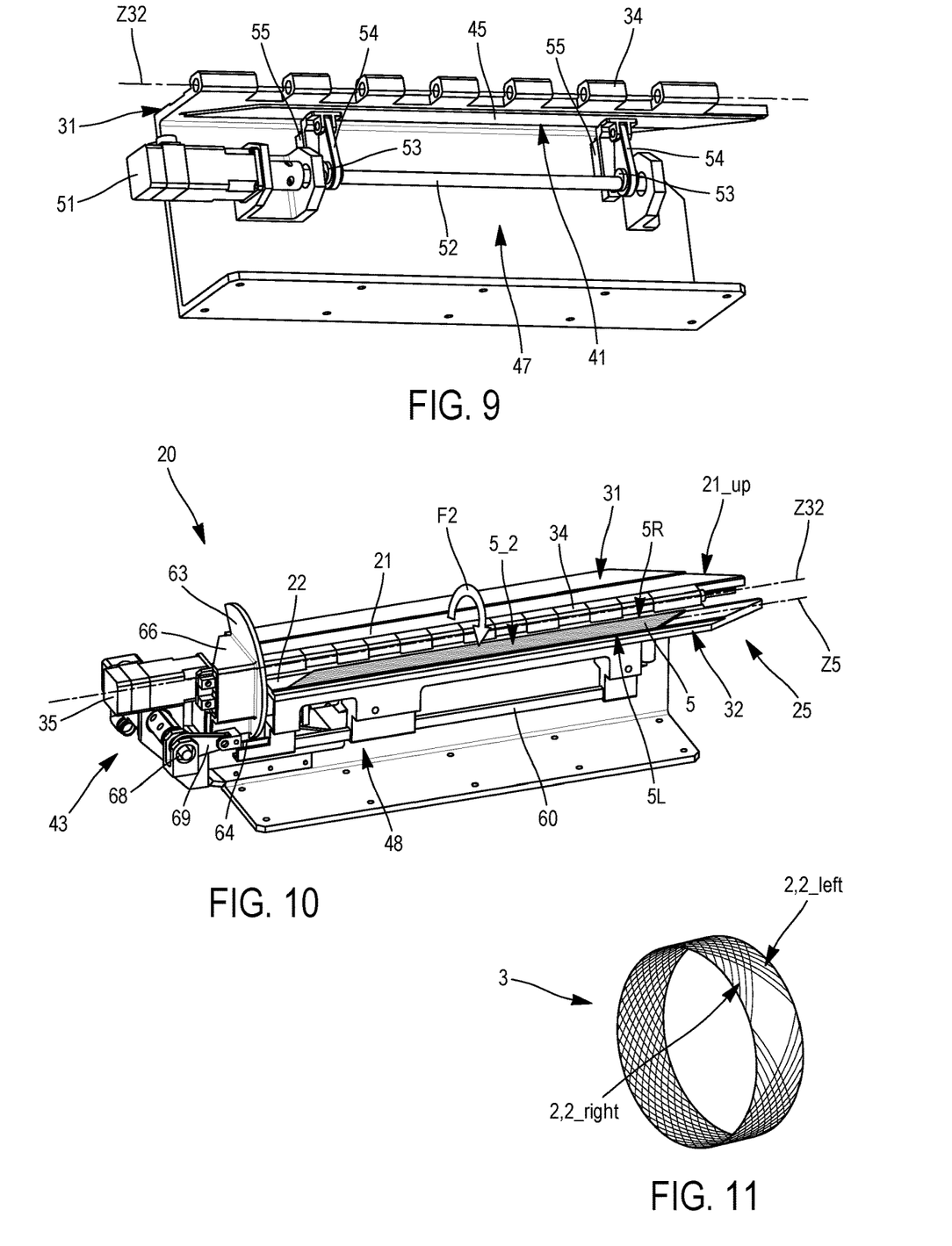
FIG. 9 illustrates, according to a perspective view, the detail of the first flap of the turning-over station, and the corresponding holding member with permanent magnet and the associated maneuvering mechanism.
FIG. 10 illustrates, according to a perspective view, the turning-over station of FIGS. 5 to 8 after the transfer of the strip to the second receiving surface and opening of the second flap.
FIG. 11 illustrates, according to a perspective schematic view, the principle of an arrangement, within a tire crown block, of two crossed reinforcing plies produced by an installation according to the disclosure.

Preferably, as is illustrated in FIG. 11, the reinforcing ply 2 can be intended to be used in the composition of the "crown block" of a tire 3, in order to reinforce the structure of said pneumatic tire in a circumferential space contained between the carcass ply and the tread.

Figure 1:
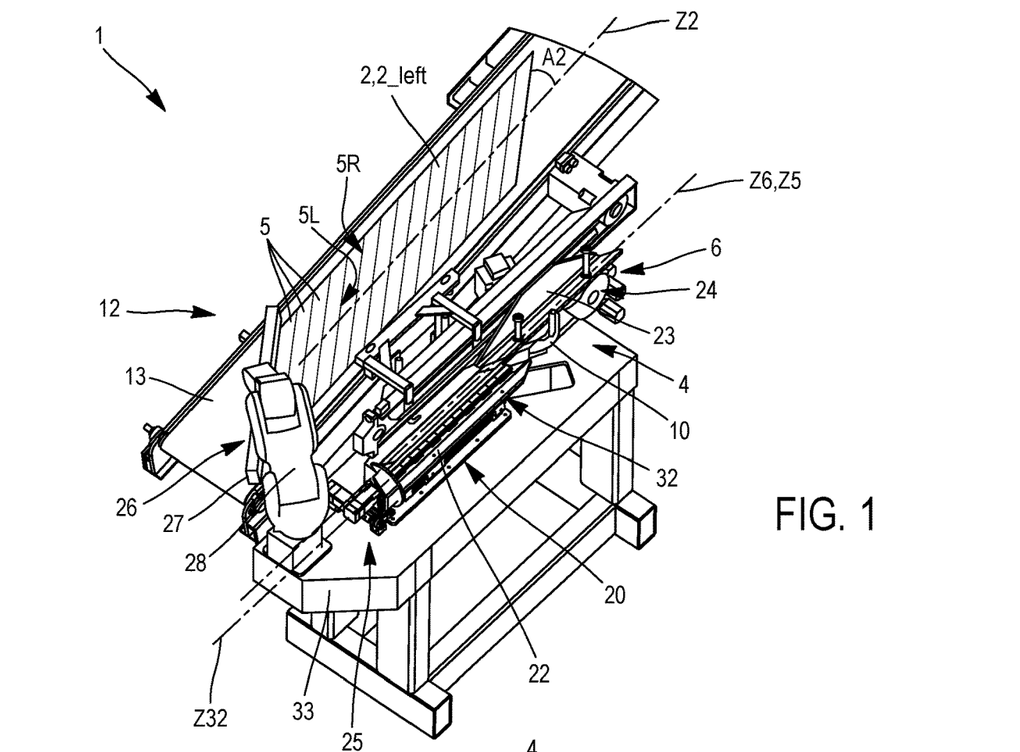
FIG. 1 illustrates, according to an overall perspective view, an example of installation according to the disclosure.
Figure 2:
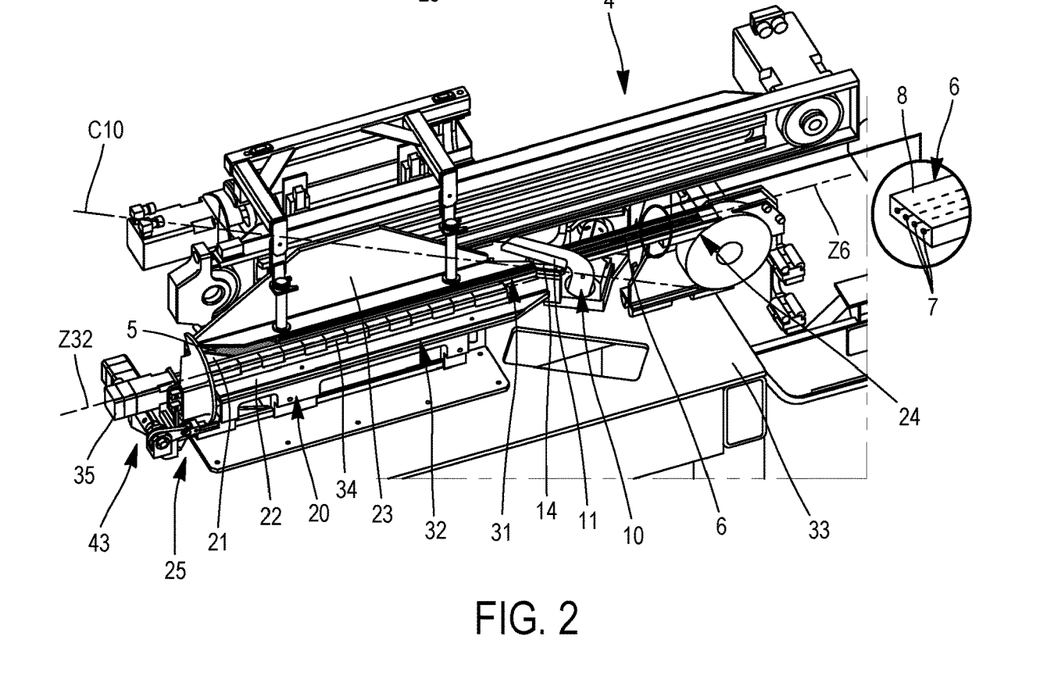
FIG. 2 illustrates, according to a perspective detail view, the preparation station and the turning-over station of the installation of FIG. 1.

The installation comprises, first of all, as can be seen in FIGS. 1 and 2, a preparation station 4 which is arranged to prepare strips 5 by cutting a band called "straight wire band" 6.

Said straight wire band 6 is, as is known per se, formed by a plurality of reinforcing wires 7, preferably continuous, which are embedded in at least one layer of rubber 8 and which extend parallel to one another in the longitudinal direction Z6 of said straight wire band 6.

The reinforcing wires 7 can be made of metallic material or of fabric material, such as nylon or aramid, or of any other appropriate material whose modulus of elasticity is greater than that of the rubber. The material of the reinforcing wires will be chosen according to the properties that are desired of the strips 5.

Preferably, the constituent material of all or part of the reinforcing wires 7 will be sensitive to magnetic attraction, so as to allow a handling of the straight wire band 6 and/or of the strips 5 obtained therefrom by magnet holding members.

According to one possible preferential implementation, each reinforcing wire 7 can be a single strand, that is to say formed by a single strand in a single piece.

As a variant, without departing from the scope of the disclosure, each reinforcing wire 7 could however be multi-stranded, that is to say formed by several strands joined by braiding into a cable.

"Rubber" 8 designates an elastomer material, based on raw rubber, that is to say non-vulcanized rubber, or based on a mixture of raw rubbers, wherein said rubber or rubbers can be synthetic or natural.

Naturally, said rubber 8 can contain fillers, such as silica or carbon black, additives, such as sulpha, plasticizers, such as oils, etc.

The straight wire band 6 can be produced for example by a calendering operation, during which the reinforcing wires 7 arranged parallel to one another are engaged between two layers of rubber 8 (also called "rubber skim") which are pressed against one another by means of counter-rotating cylinders.

Naturally, it is possible to use, without departing from the scope of the disclosure, any other suitable method for manufacturing straight wire bands 6, for example an extrusion method.

The preparation station 4 will also comprise a cutter 10, which is arranged to transversely cut, repeatedly, the straight wire band 6 according to a predetermined cutting direction C10, so as to form sections of straight wire band of predetermined length.

The cutting direction C10 is secant to the longitudinal direction of the reinforcing wires 7, and forms, relative to the longitudinal direction of the reinforcing wires 7, and therefore relative to the longitudinal direction Z6 of the straight wire band 6, a cutting angle which corresponds to the targeted ply angle A2.

Each section of straight wire band that is thus obtained, which extends between two successive cutting lines, and which preferably has a bevelled form (given that the cutting direction C10 is not strictly at right angles to the reinforcing wires 7), forms a strip 5 within the meaning of the disclosure.

To simplify the description, the longitudinal direction Z5 of the strip 5 can be likened to the direction of orientation of the reinforcing wires 7 within said strip 5.

By convention, the lateral edges of the strip 5, which extend parallel to the reinforcing wires 7, are designated "selvedges" 5L, 5R.

The cutter 10 may comprise any appropriate cutting member 11, for example a rectilinear blade 11 of guillotine type, oriented according to the desired cutting direction C10, as is illustrated in FIG. 2, or else, according to another example, a cutting disc which rolls along a rail oriented according to the desired cutting direction C10.

In order to support the end of the strip 5 during the cutting operation, the cutter 10 will preferably comprise, as can be seen in FIG. 2, an anvil 14, which is arranged to cooperate with the cutting member 11, for example the blade 11, to produce the shearing effect necessary to the cutting.

The cutter 10 can preferably be oriented, so as to be able to freely select the cutting direction C10, relative to the longitudinal direction Z6 of the straight wire band 6, and therefore so as to be able to freely select the cutting angle, and consequently the resulting ply angle A2, from among a plurality of possible cutting angles.

To simplify the description, the cutting angle and the ply angle A2 can be likened, in absolute value, in the text below.

As is illustrated in FIG. 1, the installation 1 also comprises a jointing station 12 which is arranged to successively butt joint, by their selvedges 5L, 5R, the strips 5 obtained from the preparation station 4, so as to form a reinforcing ply 2, 2_left, 2_right.

Figure 3:
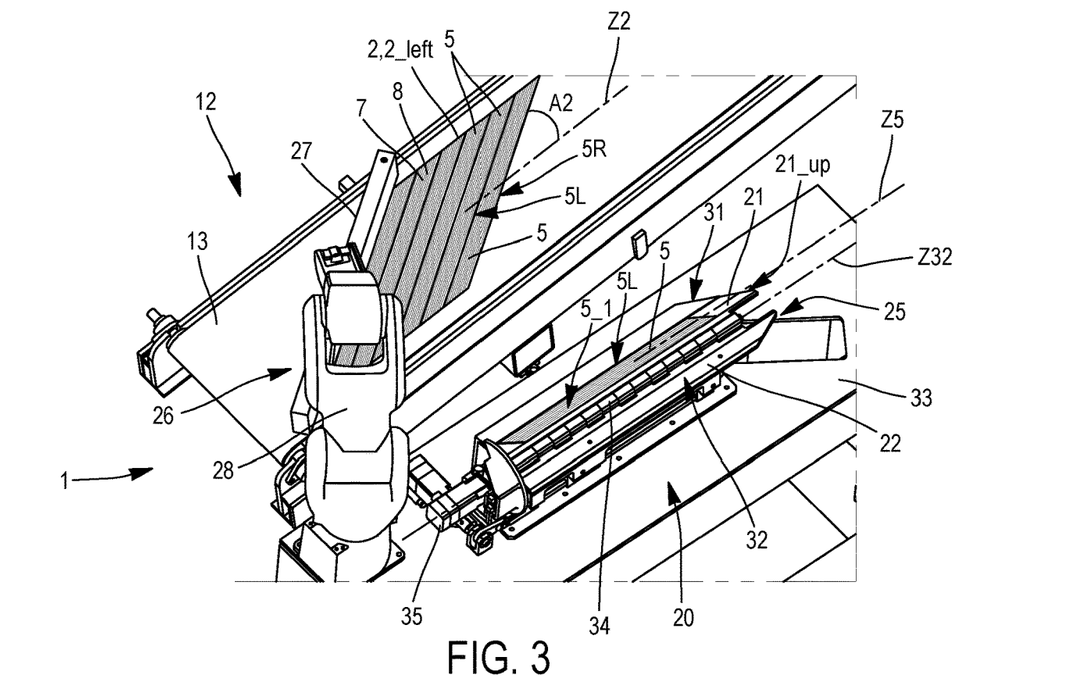
FIG. 3 illustrates, according to a perspective detail view, the construction of a reinforcing ply with left-hand ply angle, from strips that are not turned over, transferred from the first receiving surface of the turning-over station of an installation such as that represented in FIG. 1.
Figure 4:
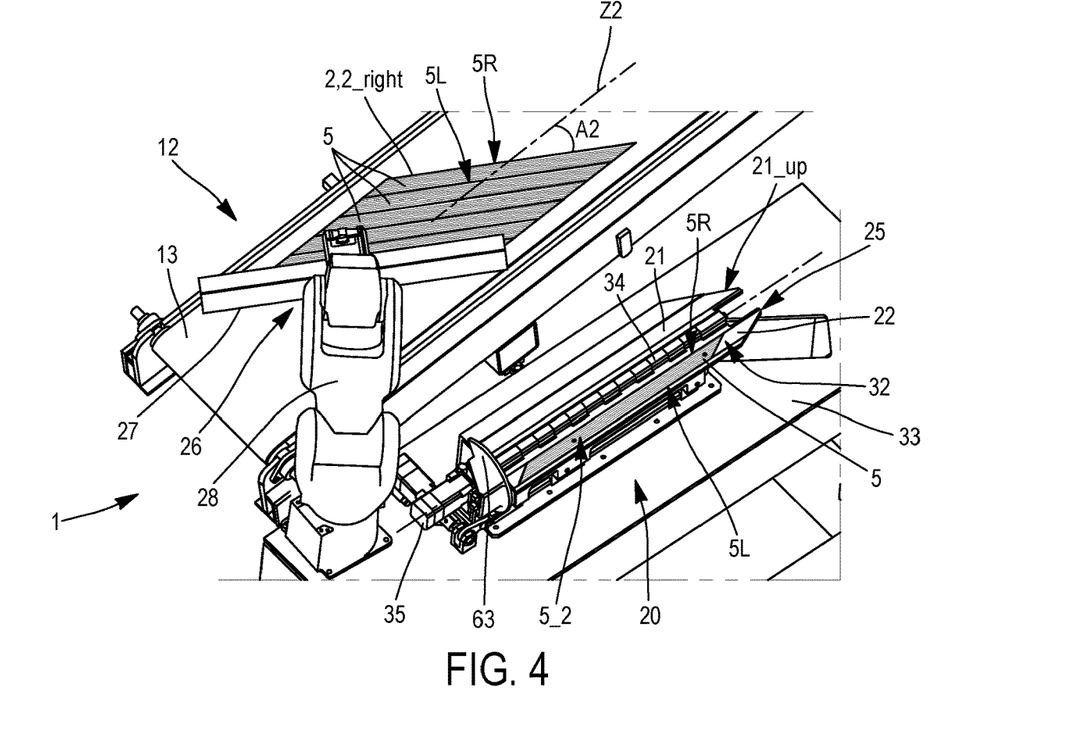
FIG. 4 illustrates, according to a perspective detail view, the construction of a reinforcing ply with right-hand ply angle, from plies turned over, transferred from the second receiving surface of the turning-over station of the installation of FIG. 3.

To this end, said jointing station 12 preferably comprises an assembly surface 13, which can for example be a cylinder, a toroidal core, or, preferably, as is illustrated in FIGS. 1, 3 and 4, a substantially flat assembly belt. To simplify the description, said assembly surface 13 can be likened to an assembly belt in the text below.

Said assembly surface 13 is arranged to receive a plurality of strips 5 which are deposited and successively butt-jointed to one another to progressively form the reinforcing ply 2.

Said assembly surface 13 is preferably motorized so as to be shifted progressively, in the longitudinal direction Z2 of the reinforcing ply 2, as the strips 5 are laid.

According to the disclosure, the installation 1 comprises a strip turning-over station 20 which is interposed between the preparation station 4 and the jointing station 12.

Said turning-over station 20 will advantageously make it possible to turn over the strip 5, when necessary, after said strip 5 has been detached from the straight wire band 6 by the cutter 10.

Figure 5:
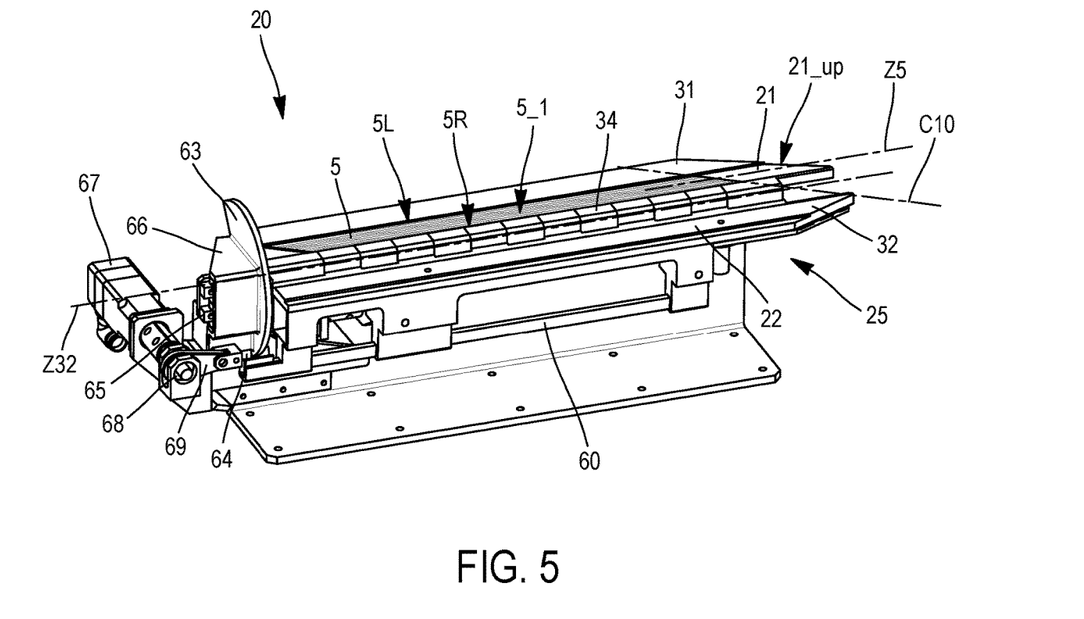
FIG. 5 illustrates, according to a perspective detail view, a turning-over station with articulated flaps used by the installation of FIGS. 1 to 4, with a strip, not turned over, which rests on the first receiving surface, in a first orientation.

As is notably visible in FIGS. 2, 3, 4, 5 and 10, said strip turning-over station 20 comprises, first of all, a first receiving surface 21, which is arranged to receive a strip 5 prepared by the preparation station 4 and to hold said strip 5 according to a first orientation, which corresponds here to FIGS. 2, 3 and 5.

In this first orientation, said strip 5, which is delimited in thickness by a first face 5_1 and by a second face 5_2 opposite said first face 5_1, rests and is held on the first receiving surface 21 by its second face 5_2 (here oriented downwards in FIGS. 2, 3 and 5), and presents its first face 5_1 as visible face (here oriented upwards in these same FIGS. 2, 3 and 5).

The "visible face" of the strip 5, here the first face 5_1 in the first orientation, corresponds, unlike the "hidden face" of the strip 5 which rests against the receiving surface 21, to the free face of the strip 5, which remains visible and accessible when the strip 5 rests on the receiving face 21 in order to be either turned over or directly transferred as is to the jointing station 12.

It will be noted that, according to a first possibility of implementation of the disclosure, the preparation station 4 will be able to comprise a transporter 23, arranged to take the straight wire band 6 and bring the latter as far as the first receiving surface 21 of the turning-over station 20, here by a right-to-left movement in FIG. 2.

The cutter 10 will then be able to be actuated once the straight wire band 6 is pressed by the transporter 23 against the first receiving surface 21, in a position called "cutting position". That way, the strip 5 thus detached from the straight wire band 6 will be located directly on the first receiving surface 21.

The transporter 23 will be able notably to be movably mounted in horizontal translation in order to be able to go to and from between, on the one hand, a supply station 24 which brings the straight wire band 6 to the preparation station 4 and, on the other hand, the first receiving surface 21.

Said transporter 23 may be provided with magnetized gripping means to grip the straight wire band 6.

An example of operation of such a transporter 23 (or "transfer means") associated with a cutter (10) (or "cutting means") is notably described in the application WO-2010/066895 filed by the applicant.

That being the case, it would of course be possible to provide, without departing from the scope of the disclosure, any equivalent preparation station 4, and more particularly any equivalent system making it possible to cut strips 5 and to convey said strips 5 to the first receiving surface 21.

In particular, it would be possible to envisage cutting the strip 5 and separating it from the straight wire band 6 before transporting said strip 5 to the first receiving surface 21.

According to the disclosure, the strip turning-over station 20 also comprises a second receiving surface 22.

Said second receiving surface 22 is associated with a reversing device 25 which is arranged to transfer a strip 5, initially placed and held on the first receiving surface 21, from said first receiving surface 21 to said second receiving surface 22, thus turning over the strip 5 so as to give said strip 5 a second orientation, that is the reverse of the first orientation.

In said second orientation, the strip 5 is this time held against the second receiving surface 22 by its first face 5_1, and presents its second face 5_2 as visible face, as can be seen in FIGS. 4 and 10.

Advantageously, by swapping the support which holds the strip 5, here by transferring said strip 5 from a first support formed by the first receiving surface 21 to a distinct second support formed by the second receiving surface 22, the strip 5 can be turned over by applying a mirror symmetry, relative to a median plane of symmetry contained between and parallel to the first face 5_1 and the second face 5_2 of the strip 5, and thus make available, to the jointing station 12, a turned-over strip 5 whose cutting angle, and consequently the ply angle A2 which results therefrom, has the same absolute value as, but is of opposite sign to, the cutting angle of the strip 5 that is not turned over.

In practice, it is thus possible to selectively retain or reverse the orientation of the bevel of the strip 5, such that this bevel is defined by the cutting direction C10 imparted by the cutter 10, depending on whether the aim is to produce a reinforcing ply with left-hand angle 2_left (FIG. 3) or, on the contrary, a reinforcing ply with right-hand angle 2_right (FIG. 4).

According to the disclosure, the installation 1 also comprises a gripping member 26 which is arranged to take a strip 5 selectively from the first receiving surface 21 or from the second receiving surface 22 in order to allow the jointing station 12 to selectively construct a reinforcing ply 2, 2_left, 2_right from strips 5 oriented in accordance with the first orientation or, respectively, from strips 5 oriented in accordance with the second orientation.

Thus, as is illustrated in the example of FIG. 3, when a reinforcing ply with left-hand angle 2_left has to be constructed, the gripping member 26 will be able to successively take a plurality of strips 5 that are not turned over, made available by the preparation station 4 on the first receiving surface 21, in accordance with the first orientation.

On the contrary, when a reinforcing ply with right-hand angle 2_right has to be constructed, as is illustrated in FIG. 4, the gripping member 26 will be able to successively take from the second receiving surface 22 a plurality of strips 5 that are turned over in accordance with the second orientation, which will have been successively placed by the preparation station 4 on the first receiving surface 21 then turned over by transfer to the second receiving surface 22.

By virtue of the turning-over station 20 according to the disclosure, it will be possible to interchangeably manufacture reinforcing plies with left-hand angle 2_left and corresponding reinforcing plies with right-hand angle 2_right, and thus have all the reinforcing plies 2_left, 2_right necessary to construct a crown block with crossed plies, by means of one and the same installation 1, and do so without it being necessary to reverse the cutting direction C10, that is to say without it being necessary to reverse the sign of the cutting angle at the cutter 10.

In particular, to take the case of a first variant application according to which the aim is to make, typically to produce the crown block of one and the same pneumatic tire, on the one hand, a first reinforcing ply with left-hand angle 2_left and on the other hand a second reinforcing ply with right-hand angle 2_right whose cutting angle A2 is exactly symmetrical to the cutting angle A2 of the reinforcing ply with left-hand angle 2_left, then the installation 1 according to the disclosure will make it possible to switch from a left-hand ply angle to a right-hand ply angle, of the same value but of opposite sign, simply by turning over, without it being necessary to reconfigure the cutting angle of the cutter 10.

According to a second variant application, on may want to superpose, to form a crown block, at least one first left-hand reinforcing ply 2_left and one second right-hand reinforcing ply 2_right, but by using plies 2_left, 2_right which might have, as absolute value, different respective cutting angles A2, that is to say reinforcing plies that are not symmetrical to one another relative to their common longitudinal direction Z2.

According to this second variant application, the installation 1 would make it possible to switch alternately from making the first reinforcing ply 2_left to making the second reinforcing ply 2_right simply by applying a slight reorientation of the cutter 10, of small amplitude, without changing sign, that is to say without changing left/right orientation, relative to the longitudinal direction Z6 of the straight wire band 6.

Advantageously, the adjustment of orientation of the cutting direction C10 will then in fact apply only to the difference between the absolute values of the two cutting angles A2 considered, and not to the choice of the sign of the cutting angle A2 (and therefore potentially a reversal of the sign of the cutting angle A2), since the choice of the sign of the cutting angle A2 is managed downstream of the cutting operation and is a matter for the turning-over station 20.

In fact, the disclosure advantageously makes it possible, according to a feature which can constitute an disclosure in its own right, to dissociate, on the one hand, the definition of the value of the cutting angle, and therefore of the value of the ply angle A2, a definition which is applied by the cutter 10, and on the other hand the choice of the sign of the cutting angle, and therefore the sign of the ply angle A2, a choice which is applied then by the turning-over station 20, which can either retain the sign of the cutting angle defined by the cutter 10 by retaining the strip 5 on the first receiving surface 21, or reverse this sign by turning over the strip 5, by transferring said strip 5 to the second receiving surface 22.

According to the second variant application above, it will therefore advantageously be possible to switch from making a ply with left-hand angle 2_left to making a ply with right-hand angle 2_right while producing a minimal offcut of straight wire band 6, much less than the offcut that would have been produced if it had been necessary to reverse the sign of the cutting direction C10, thus making it possible to save on material.

The material offcuts which result from a change of cutting angle A2 will moreover be able to be evacuated by the gripping member 26 to a specific recovery bin (not represented).

It will be noted that, preferably, the laying of strips 5 by the preparation station 4 on the first receiving surface 21 is done individually, one strip after the other, each strip 5 which passes through the first receiving surface 21 being either transferred directly to the jointing station 12 or turned over before being transferred to the jointing station 12, but, in both cases, so as to free the first receiving surface 21 before the preparation station 4 puts the next strip 5 on said first receiving surface 21.

Likewise, it will be noted that, preferably, the turning over of the strips 5 by the turning-over station 20 will be done individually, strip after strip, each strip 5 turned over which arrives at the second receiving surface 22 being sent to the jointing station 12 before another strip 5 comes to replace it on the second receiving surface 22.

The individual processing of the strips 5 will notably make it possible to use a compact and lightweight turning-over station 20.

Furthermore, it will thus be possible to progressively prepare the quantity of strips 5 that is just necessary and sufficient to produce the reinforcing ply 2 with the desired length, matched closely to the needs, without material wastage.

Preferably, the gripping member 26 will be arranged to be able to grip and manipulate the strip 5 by the visible face of said strip, such that this visible face is selected and made accessible to said gripping member 26 by the turning-over station 20.

To this end, preferably, and as is notably visible in FIGS. 1, 3 and 4, the gripping member 26 will comprise a soleplate 27 which is arranged to be placed in contact with the visible face of the strip 5 which is present on the first receiving surface 21 or on the second receiving surface 22, in order to take said strip 5 by its visible face and transfer said strip 5 from the receiving surface 21, 22 that it occupies to the jointing station 12.

Depending on whether the strip 5 will be exposed on the first receiving surface 21 or will have been turned over to be exposed on the second receiving surface 22, the soleplate 27, which is movable between the turning-over station 20 and the jointing station 12, will therefore be placed on the first face 5_1 of the strip 5, or respectively on the second face 5_2 of the strip 5, in order to take said strip 5.

Advantageously, the strip 5 being sandwiched between the soleplate 27 and the receiving surface 21, 22 when said strip is gripped, there will be an assurance of a permanent hold on said strip 5, over most or even all of the surface extent of the visible surface of said strip 5, thus avoiding any deformation of the strip 5, or any shifting of said strip 5 within the machine reference frames associated with the turning-over station 20 and with the jointing station 12.

Preferably, the soleplate 27 will be flat, in order to ensure an optimal gripping quality.

Preferably, the soleplate 27 will be magnetized, so as to be able to ensure a magnetic grip on the strip 5.

According to a preferential possibility of arrangement of the installation 1, the gripping member 26 of the turning-over station 20 is shared with the jointing station 12, as is illustrated in FIGS. 1, 3 and 4, such that said gripping member 26 can take a strip 5 from the receiving surface 21, 22 that said strip 5 occupies then directly deposit said strip 5 on an assembly belt 13 of the jointing station 12, by butt-jointing said strip 5 with a strip 5 already present on said assembly belt 13.

The installation 1 will thus gain in compactness, as well as in accuracy, in as much as it is possible to retain a machine reference frame common to the turning-over station 20 and to the jointing station 12.

The operations of taking, preferably individually taking, strips 5 from the receiving surface 21, 22 which corresponds to the chosen orientation on the one hand, and of butt-jointing on the assembly belt 13 on the other hand, will be repeated as many times as necessary to construct the reinforcing ply 2 of the desired length.

Typically, the length of the reinforcing ply 2 will be substantially, even exactly, equal to the circular perimeter of the crown block of the pneumatic tire 3 concerned, such that said reinforcing ply 2 can be closed on itself in a ring, by welding its ends, around the central axis of said pneumatic tire.

It will also be noted that, preferably, the gripping member 26 will be able to be borne by a robotized arm 28, preferentially a robotized arm with six axes, as is visible in FIGS. 1, 3 and 4.

The use of such a robotized arm 28 ensures the versatility and the dexterity of said gripping member 26, and notably its capacity to interchangeably take and butt-joint strips 5 oriented according to the first orientation or strips 5 oriented according to the second orientation, while limiting the bulk of the gripping member 26.

The soleplate 27 will be able to be engaged, as terminal tool, on the wrist of the robotized arm 28. That notably makes it possible to easily adjust the orientation in azimuth (in yaw) of the soleplate 27, notably relative to the turning-over station 20 and relative to the assembly belt 13, according to the orientation which will have been retained to present the strip 5 and to incorporate the strip 5 in the reinforcing ply 2.

Preferably, the first receiving surface 21 and the second receiving surface 22 are flat.

Such an arrangement simplifies the laying of the strip 5 on said receiving surfaces 21, 22, and ensures a good quality hold, without risk of deformation of the strips 5.

Furthermore, such an arrangement allows a turning-over by flat transfer, by means of a relatively simple and compact swivelling toolage, as will be detailed herein below.

According to a preferential feature which can constitute an disclosure in its own right, the first receiving surface 21 is borne by a first flap 31, while the second receiving surface 22 is borne by a second flap 32 which is articulated relative to said first flap 31, on an axis called "turnover axis" Z32, so as to be able to swivel relative to said first flap 31 and thus alternately be closed on the first flap 31 or be opened by moving away from said first flap 31.

Such a structure with swivelling flaps 31, 32 is advantageously simple and robust. It also allows for a stable hold of the strip 5 throughout the process of laying of the strip 5 on the first receiving surface 21, then of turning over of said strip 5.

The first flap 31 is preferably fixed, and for example secured to the same frame 33 as the robotized arm 28 of the gripping member 26, and/or secured to the same frame 33 as the preparation station 4.

Figure 6:
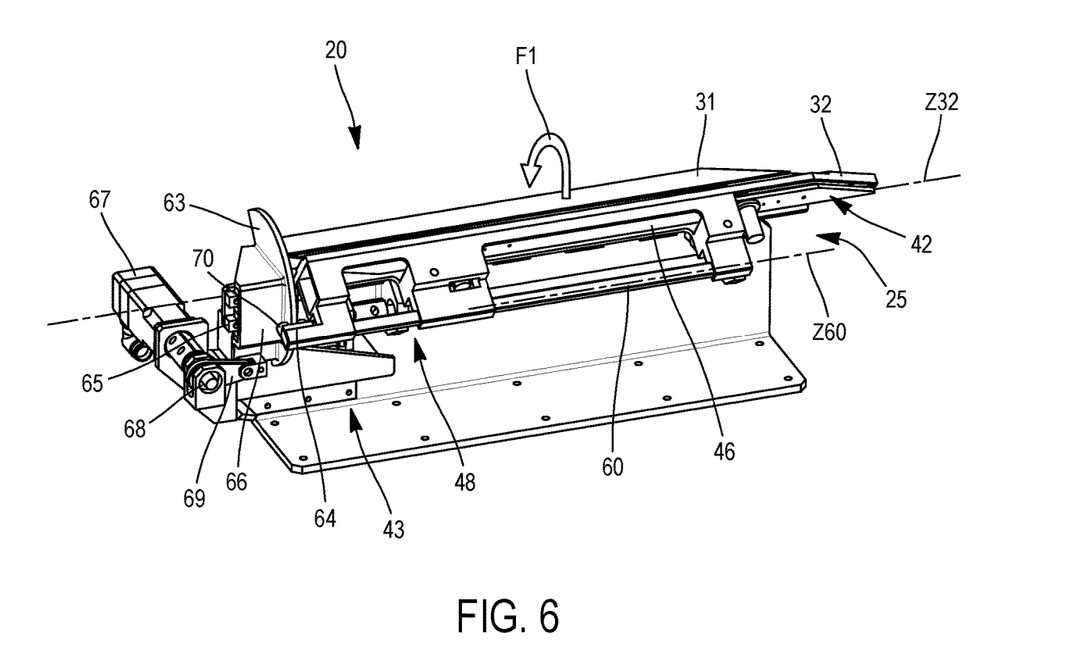
FIG. 6 illustrates, according to a perspective detail view, the swivelling movement of the second flap of the turning-over station on the first flap bearing the strip, in a direction of closure.

To apply the turning over, the second flap 32, which is movable, is closed (FIG. 6) on the first flap 31 and on the first face 5_1 of the strip 5 to sandwich the strip 5 (FIG. 7) between, on the one hand, the first receiving surface 21, borne by the first flap 31, and, on the other hand, the second receiving surface 22 borne by the second flap 32, so as to transfer the strip 5 from the first flap 31 to the second flap 32 (FIG. 8), then the second flap 32 is opened by moving away from the first flap 31 and by carrying with it the strip 5, so as to expose the second face 5_2 of the strip 5 (FIG. 10).

Naturally, it would be possible to consider, as a variant, without departing from the scope of the disclosure, a reversing device 25 configuration in which the relative swivelling movement of one flap 32 relative to the other flap 31 would be ensured either by a first flap 31 which would be movable by swivelling relative to a second flap 32 that is fixed, or by an assembly with two movable flaps, in which each of the first and second flaps 31, 32 would be movable by swivelling relative to one and the same frame 33 and relative to the other flap 32, 31.

The turnover axis Z32 is preferably embodied by a hinge 34 provided between the first flap 31 and the second flap 32.

The turnover axis Z32 will preferably be oriented parallel to the plane of the first receiving surface 21, and parallel to the plane of the second receiving surface 22.

In absolute terms, the turnover axis Z32 could be oriented transversely to the longitudinal direction of the reinforcing wires, and therefore transversely to the longitudinal direction Z5 of the strip 5, so as to allow a turning over of the strip 5 by pitch motion.

However, preferably, and as is notably illustrated in FIGS. 1 to 7 and 10, the turnover axis Z32 will be oriented parallel to the longitudinal direction Z5 of the strip 5, so as to allow a turning over of the strip 5 by roll motion.

Such an arrangement in fact offers a better compactness and a better stability, by virtue of a more extensive guidance of the hinge 34 and a lesser inertia of the flaps 31, 32 in the movements of the flap or flaps 31, 32.

The swivelling movement of the second flap 32 will be able to be conferred by a turning-over motor 35, preferably electrical, which will be able to engage on said second flap 32 via a coupling, for example by pinning or keying, between the shaft of said turning-over motor 35, which can serve as hinge pin for the hinge 34, and said second flap 32.

The flaps 31, 32 will of course be produced in any appropriate rigid material, preferably metallic.

Naturally, the first and second receiving surfaces 21, 22 will be arranged so as to be able to exert, on the strip 5 which is in contact with the receiving surface 21, 22 concerned, an attraction force which makes it possible to retain said strip 5 on and against said receiving surface 21, 22 concerned, in order to ensure a holding of said strip 5 in a fixed position on said receiving surface 21, 22 concerned, in particular during the swivelling movements of the first flap 31 and/or of the second flap 32.

Preferably, each of the first and second receiving surfaces 21, 22 has, to this end, its own holding member or members 41, 42, which are arranged to, when activated, attract and press the strip 5 against the receiving surface 21, 22 concerned, and which are placed under the dependency of a control system 43 which drives the activation of said holding members 41, 42.

More particularly, the turning-over station 20 comprises first holding members 41 associated with the first receiving surface 21 and second holding members 42 associated with the second receiving surface 22, as well as a control system allows 43 which makes it possible to selectively adjust the activation, or the intensity of activation, of said holding members 41, 42, so as, notably, to be able to confer on said second holding members 42, in order to apply the transfer of the strip 5 from the first receiving surface 21 to the second receiving surface 22, a greater attraction force than the attraction force which is exerted by the first holding members 41.

The holding members 41, 42 will be able to be of any appropriate kind to hold a strip 5 pressed against a receiving surface 21, 22.

Thus, in absolute terms, it would for example be possible to envisage vacuum-operated holding members 41, 42, of sucker type. However, such a solution presents the drawback of increasing the time needed to activate the holding members and, more globally, the cycle time of the installation 1.

That is why preference may be given, when compatible with the nature of the strips 5 to be manipulated, to magnetic holding members 41, 42, with permanent magnets and/or electromagnets.

According to a preferential arrangement of the disclosure, the holding member or members 41 associated with the first receiving surface 21, called "first holding members" 41, and/or the holding member or members 42 associated with the second receiving surface 22, called "second holding members" 42, comprise a permanent magnet 45, 46, respectively a first permanent magnet 45 and/or a second permanent magnet 46, which is movably mounted on the back of the receiving surface 21, 22 concerned.

The control system 43 then preferably comprises a maneuvering mechanism 47, 48 which is arranged to selectively move said permanent magnet 45, 46 closer to or away from the receiving surface 21, 22 concerned in order to modify the magnetic attraction force exerted at said receiving surface 21, 22 by said permanent magnet 45, 46.

More particularly, the control system 43 may be thus arranged so as to create, upon the transfer of the strip 5 necessary to the turning over, a magnetic attraction force, directed towards the second receiving surface 22, which is greater than the magnetic force which tends to retain this same strip 5 in contact with the first receiving surface 21, from which the strip 5 has to be detached upon said transfer.

Figure 8:
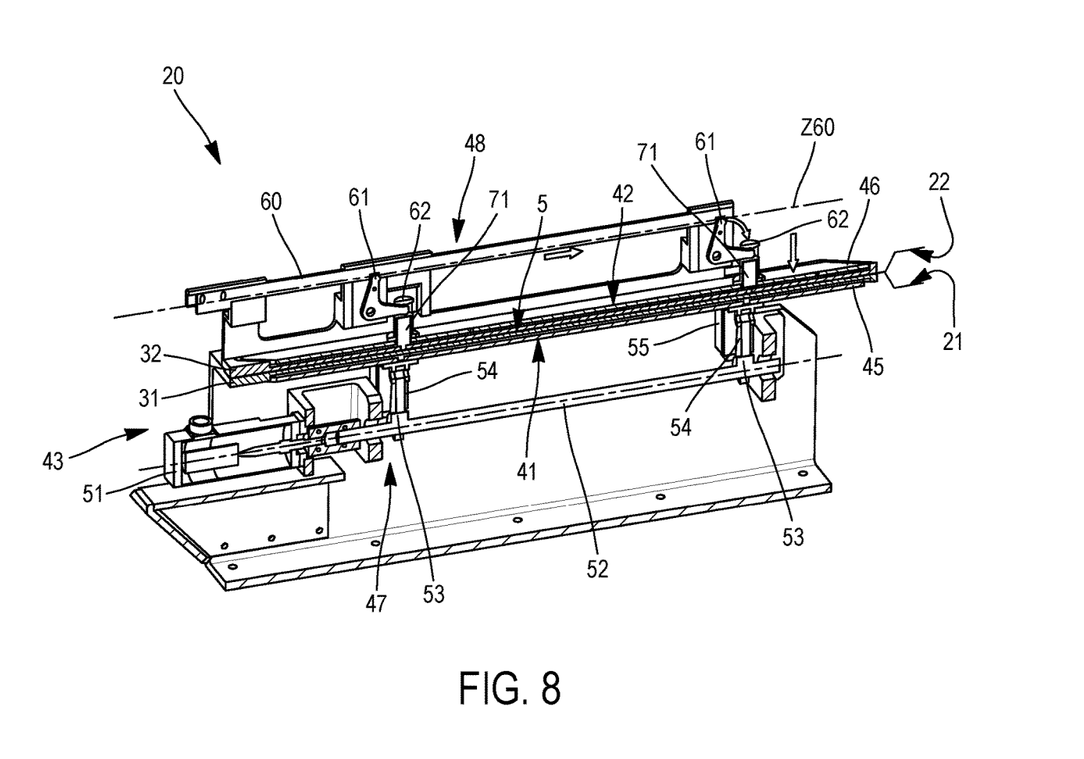
FIG. 8 illustrates, according to a perspective detail view with material cut away, a phase in which, the second flap being closed on the first flap, a holding member associated with the second flap is activated, by controlling the translation of a maneuvering rod which acts on levers linked to push rods, so as to bring a permanent magnet close to the second receiving surface borne by said second flap, and to thus be able to attract and press the strip against the second receiving surface.

Preferably, the permanent magnet 45, 46 may take the form of a magnetized plate, as is visible in FIGS. 8 and 9.

For convenience of description, permanent magnet 45, 46 and magnetized plate may be assimilated one to the other herein below.

Preferably, the magnetized plate 45, 46 will be placed against, in thickness, the receiving surface 21, 22 which corresponds to it.

The reversing device 25 arranged to transfer the strip 5 from the first receiving surface 21 to the second receiving surface 22, as mentioned above, will thus be able to correspond, according to one possible implementation of the disclosure, to a subassembly which comprises the first flap 31 bearing the first receiving surface 21 and its holding members 41, the second flap 32 being the second receiving surface 22 and its holding members 42, the hinge 34 allowing the articulation of the relative of the second flap 32 relative to the first flap 31, the turning-over motor 35, the control system 43 which coordinates the action of the holding members 41, 42, and the corresponding maneuvering mechanisms 47, 48.

Preferably, the maneuvering mechanism 47, 48 will be able to comprise a linkage system, which makes it possible to alternately control the moving of the magnetized plate 45, 46 closer to and, on the contrary, away from, the associated receiving surface 21, 22.

Thus, by way of example, a first maneuvering mechanism 47 which is used to maneuver the first holding member or members 41, and which to this end is associated with the first receiving surface 21 to drive the positioning of the first magnetized plate 45 relative to said first receiving surface 21, and which is preferably mounted to this end on the first flap 31, will be able to comprise, as is notably visible in FIGS. 8 and 9, a first control motor 51, preferably electrical, which is coupled to a shaft 52 provided with at least one first eccentric member 53 which cooperates with a first connecting rod 54 linked to the first magnetized plate 45.

That way, when the first control motor 51 makes the shaft 53 execute a half-revolution, it alternately switches the first magnetized plate 45, here by a travel directed substantially at right angles to the plane of the first receiving surface 21, from a first position closest to the first receiving surface 21, to which the maximum magnetic attraction force corresponds, to a second position further away from the first receiving surface 21, to which the minimum magnetic attraction force corresponds.

Naturally, the eccentric member 53 will be able to take any appropriate form without departing from the scope of the disclosure, such as, for example, the form of an eccentric core, of a cam or a crank.

If necessary, the first magnetized plate 45 will be able to be guided in translation, at right angles to the back of the first receiving surface 21, by any appropriate means, for example by means of guides 55 (here vertical guides 55 in FIGS. 8 and 9) fixed to the first flap 31 and with which tabs fixed to said first magnetized plate 45 cooperate.

According to a preferential feature which can constitute an disclosure in its own right, the (second) maneuvering mechanism 48 which is used to maneuver the second holding member or members 42 associated with the second flap 32, called "second maneuvering mechanism" 48, comprises, as is notably illustrated in FIGS. 5 to 8:

on the one hand, a maneuvering rod 60 which is embedded on the second flap 32 and mounted so as to be movable in translation on an axis called "rod axis" Z60 parallel to the turnover axis Z32, said maneuvering rod 60 being arranged so that its displacements in translation control the displacements moving the second permanent magnet 46 away from/closer to the second receiving surface 22, for example by controlling the swivelling of at least one lever 61 which acts in turn on a push rod 62 which drives the second permanent magnet 46 in displacement relative to the second receiving surface 22, on the other hand, a portion 63 of circular flange, which extends at right angles to the turnover axis Z32, the horizontal position of which along said turnover axis Z32 can be modified by the control system 43, and which covers, around said turnover axis Z32, an angular sector which is at least equal to angular travel, called "useful angular travel", which allows the second flap 32 to swivel relative to the first flap 31 so as to turn over a strip 5, and finally a cursor 64 which is fixed at the end of the maneuvering rod 60 and which cooperates with the portion of flange 63 so that said cursor 64 is displaced along said portion of flange 63 to accompany the joint swivelling of the maneuvering rod 60 and of the second flap 32 around the turnover axis Z32 while remaining engaged with said portion of flange 63 irrespective of the angular position of the second flap 32 relative to the first flap 31 around the turnover axis Z32, along the useful angular travel, so that a modification of the horizontal position of the portion of flange 43 is transmitted to the maneuvering rod 60 through said cursor 64 and thus makes it possible to adjust the position of the second permanent magnet 46 relative to the second receiving surface 22 borne by the second flap 32.

Advantageously, such an arrangement allows the control system 43 to remain operational over all the trajectory of the second flap 32, irrespective of the angular position of the second flap 32 relative to the first flap 31, and, in particular, makes it possible to trigger the activation of the second holding member 42 when the second flap 32 is folded back against the first flap 31 to transfer the strip to said second flap 32, then to maintain this activation while the second flap 32 is opened, in order to hold the strip 5 during the swivelling, then, if appropriate, once the second flap 32 is open, to deactivate the second holding member 42 to release the strip 5 from the second receiving surface 22, after the gripping member 26 has engaged on said strip 5 exposed on said second receiving surface 22.

The useful angular travel of the second flap 32 will typically lie between, on the one hand, a first angular position, called "closed position", in which the second flap 32 is folded back against the first flap 31, so as to press the second receiving surface 22 on the first face 5_1 of the strip 5, and, on the other hand, a second angular position, called "open position", in which the second flap 32 is sufficiently far away from the first flap 31 to make the strip 5, and more particularly the second face 5_2 of the strip 5, accessible to the gripping member 26, on the second receiving surface 22.

As an indication, said useful angular travel, and consequently the angular sector covered by the portion of flange 63, will preferably lie between 120 degrees and 240 degrees, and more preferentially be equal to 180 degrees to +/−10 degrees.

Preferentially, in the open position, the first receiving surface 21 and the second receiving surface 22 will be parallel, and more preferentially coplanar, so as to facilitate the gripping of the strip 5 by the gripping member 26 without preference on said first receiving surface 21 or on second receiving surface 22.

The portion of flange 63 will be able to be movably mounted and guided in translation along the turnover axis Z32 by any appropriate guiding system, preferably secured to the frame 33.

Figure 7:
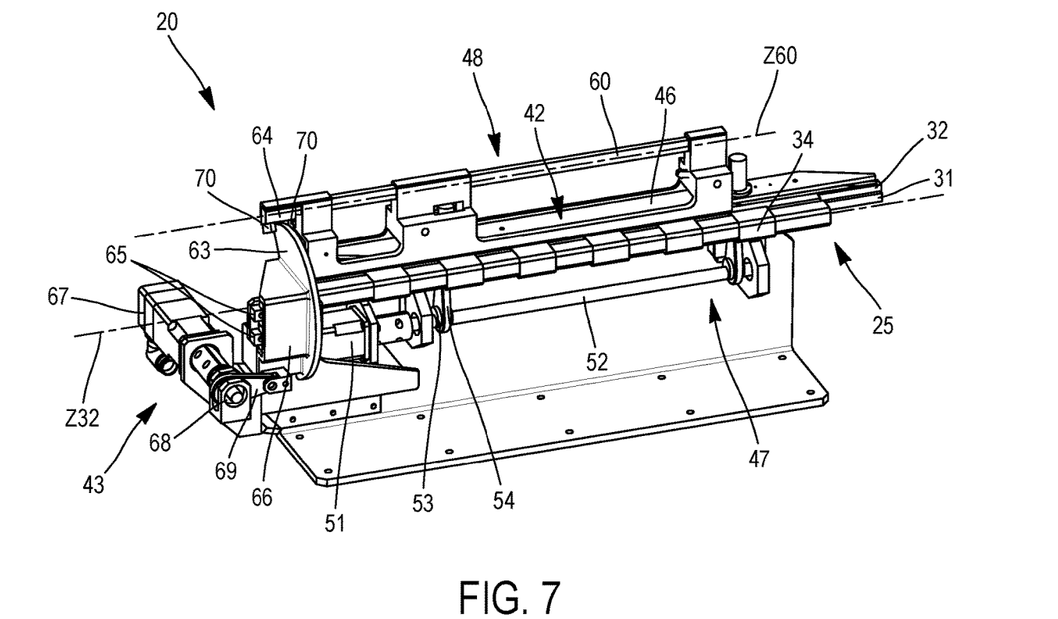
FIG. 7 illustrates, according to a perspective detail view, the second flap of the turning-over station in position folded back against the first flap, to allow the transfer of the strip from the first receiving surface borne by the first flap to the second receiving surface borne by the second flap.

For example, the portion of flange 63 will to this end be able to be borne by a carriage 66 which slides along one or more guiding rails 65, here horizontal, as is illustrated in FIG. 7.

The displacement in translation of said flange 63 will be able to be driven by any appropriate means, preferably by means of a second control motor 67, preferably electrical, which will for example be able to actuate a linkage system comprising a second eccentric member 68 cooperating with a second connecting rod 69 coupled to the carriage 66 which bears the portion of flange 63, as is notably visible in FIGS. 5 to 7 and 10.

It will be noted that the use of a linkage system, whether it be for the first and/or the second maneuvering mechanism 47, 48, notably offers the advantage, in addition to offering a good intrinsic robustness, of allowing a rapid and accurate actuation, given the small travel which is necessary to, and sufficient for, the activation of the corresponding holding members 41, 42.

Furthermore, such a linkage system is well suited to a bistable reversible operation, that makes it possible to easily switch over between an activated state and a deactivated state of the holding member 41, 42 concerned, and to keep said holding member 41, 42 in the selected state until the next state switchover takes place.

The second magnetized plate 46 will be able to be guided in translation at right angles to the second receiving surface 22 by any appropriate means, and for example by means of guiding fingers 71 on which the push rods 62 slide, as is illustrated in FIG. 8. The push rods 62 will, to this end, be able to have a hollow cylindrical stock substantially conjugate with the corresponding guiding finger 71, on and around which said push rod 62 can thus engage and slide.

The cursor 64 will preferably be able to take the form of a fork, the branches of which will extend on either side of the thickness of the portion of flange 63, so as to be able to transmit both pulling and compression forces.

Said branches will for example be able to bear rollers 70 arranged to roll on the faces of the flange 63 which is thus pinched between said branches, as is illustrated in FIG. 7.

The swivelling lever or levers 61 will moreover be able to have an elbow form, for example substantially L shaped, so as to form a compact angle return between the maneuvering rod 60 and the push rods 62.

It will be noted that, in absolute terms, it would be possible to envisage applying the principle of a movement control which uses a portion of flange 63, a cursor 64 and a maneuvering rod 60 as described above, with a variant embodiment which would combine this control with a transmission mechanism other than a lever 61/push rod 62 system, for example a ramp system. That said, the use of swivelling levers 61 advantageously makes it possible to benefit from a particularly reactive and compact system, which offers a good amplitude of travel for the second magnetized plate 46.

Preferably, the first receiving surface 21 and, respectively, the second receiving surface 22, each have an extent equal to or greater than 90%, and preferentially equal to or greater than 100%, of the extent of the first face 5_1 of the strip 5 to be turned over.

The second face 5_2 of the strip preferably having the same form and the same extent as the first face 5_1, the first receiving surface 21, and respectively, the second receiving surface 22, therefore each (also) have an extent equal to or greater than 90%, and preferentially equal to or greater than 100%, of the extent of the second face 5_2 of the strip 5 to be turned over.

In any case, such an arrangement makes it possible to offer a support for the strip 5 over most, and preferentially all, or almost all, of its first face 5_1, respectively over most, preferentially over all, or almost all, of its second face 5_2.

Advantageously, by thus allowing each receiving surface 21, 22 to entirely or almost entirely contain the strip 5, there is an assurance of a stable and well distributed support and retention of the strip 5, which avoids any accidental deformation.

Moreover, the turning-over station 20 will preferably be arranged to individually turn over strips 5, and thus to process each strip 5 one by one, before the butt-jointing of the strip 5 concerned.

More particularly, each of the first and second receiving surfaces 21, 22 may be dimensioned so as to be able to accommodate at most one entire strip 5.

That will make it possible notably to maintain a relatively compact installation 1, and lighter movable elements.

It will also be noted that the cutting is performed preferably outside of the first receiving surface 21, that is to say that the cutter 10 is arranged so that the trajectory of the blade 11 does not interfere with said first receiving surface 21.

To this end, the cutter 10, and more particularly the blade 11 and the anvil 14, are preferably arranged at a distance from said receiving surface 21, in the longitudinal direction Z6 of the straight wire band 6, in immediate proximity to the rim, here the upstream rim 21_up, of the first receiving surface 21.

Said upstream rim 21_up of the first receiving surface 21, and more particularly of the first flap 31, will be able to have a bevelled form, as is visible in FIGS. 3, 4, 5 and 10, the orientation of which will preferably correspond to a mean angle representative of the mean of the cutting angles A2 most commonly implemented. That way, the cutting direction C10 will generally be substantially parallel to said upstream rim 21_up.

In absolute terms, it would be possible to envisage producing a complementary movement of the transporter 23, after the strip 5 has been cut, so as to recentre, on the first receiving surface 21, said strip 5 whose end initially, at the moment when the cutting is completed, extends slightly beyond said first receiving surface 21.

Such recentring would in fact make it possible to reposition said strip 5 entirely on the first receiving surface 21 after the cutting, before activating the first holding member 41 in order to transfer the strip 5 from the transporter 23 to the first flap 31.

However, in as much as, in cutting position, the strip 5 is in practice held effectively over most of its surface, typically over more than 80%, more than 90%, even more than 95% of the extent of its first face 5_1, it is not necessarily useful to proceed with such a recentring.

Preferably, it will therefore be possible to proceed with the transfer to the first flap 31 then directly with the turning over, without performing such a recentring.

That will notably make it possible to simplify the movements of the transporter 23.

Of course, the disclosure relates also as such to a reversing device 25 intended to turn over strips 5.

Such a reversing device 25 can notably take the form of a subassembly which makes it possible to provide an installation, if appropriate an already existing preparation-butt-jointing installation, of a turning-over station 20 according to one or other of the features described in the above.

Preferably, the disclosure can thus relate to a reversing device 25 intended to turn over a strip 5, which is delimited in thickness by a first face 5_1 and by a second face 5_2 opposite said first face 5_1.

Said reversing device 25 comprises a first flap 31 which bears a first receiving surface 21 arranged to receive a strip 5, and a second flap 32 which bears a second receiving surface 22 and which is articulated relative to said first flap 31 on an axis called "turnover axis" Z32, so as to be able to swivel relative to said first flap 31 and thus alternately either be closed on the first flap 31 or open by moving away from said first flap 31.

The first flap 31 of said reversing device 25 also comprises a first holding member 41 arranged to, when activated, attract and press the strip 5 against the first receiving surface 21, while the second flap 32 comprises a second holding member 42 arranged to, when activated, attract and press the strip 5 against the second receiving surface 22.

Finally, the first and second holding members 41, 42 are placed under the dependency of a control system 43 which drives their activation.

In this way, the reversing device 25 can turn over a strip 5, which initially rests and is held on the first receiving surface 21 of the first flap 31 in accordance with a first orientation (FIG. 5), by first of all actuating the second flap 32 in a first swivelling direction F1, called "direction of closure", around the turnover axis Z32 (FIG. 6), so as to fold back the second flap 32 onto the first flap 31 and bring the second receiving surface 22 into contact with the first face 5_1 of the strip 5 (FIGS. 7 and 8), then by activating the second holding member 42 (FIG. 8) so as to attract and hold the strip 5 against the second receiving surface 22, then by actuating the second flap 32 in a second swivelling direction F2, called "direction of opening", opposite the first swivelling direction F1, so as to move the second flap 32 away from the first flap 31 so that said second flap 32 thus carries, on its second receiving surface 22, the strip 5 oriented according to a second orientation, the reverse of the first orientation (FIG. 10).

Preferably, to maintain a holding of the strip 5 throughout the turning-over operation, the control system 43 will be designed to coordinate the operation of the holding members 41, 42 so that, after the second receiving surface 22 has been placed against the first face 5_1 of the strip 5 for the transfer, the second holding member 42 is activated before the first holding member 41 is totally deactivated.

More specifically, the control system 43 will preferably be designed to successively, once the second flap 32 has closed on the first flap 31:

activate the second holding member 42 by triggering the second control motor 67 to provoke, via the rotation of the second eccentric member 68, the translation of the portion of flange 63 and consequently of the maneuvering rod 60 (here by a thrust to the right in FIG. 8) and, concomitantly, the swivelling (here in the clockwise direction in FIG. 8) of the levers 61, so as to bring the second magnetized plate 46 closer to the second receiving surface 22 (here by a movement directed downwards, in FIG. 8), then deactivate the first holding member 41 by triggering the first control motor 51 to provoke, via the rotation of the first eccentric member 53, a retraction movement of the first magnetized plate 45 relative to the first receiving surface 21 (here a downward movement in FIGS. 8 and 9).

It will be noted that, by virtue of the portion of flange 63 and the cursor 64 which make it possible to modify, and above all lock, the state (activated or deactivated) of the second holding member 42 irrespective of the angular position of the second flap 32 relative to the first flap 31, it is possible to keep the second holding member 42 active throughout the operation of opening of the second flap 32 and do so until the strip 5 is then taken, from the second receiving surface 22, by the gripping member 26, in order to be butt-jointed.

The second holding member 42 may be deactivated once the strip 5 is gripped by the soleplate 27 of the gripping member 26, in order to release the strip 5 and allow it to be transferred to the jointing station 12.

This deactivation of the second holding member 42 may be performed by continuing the rotation of the second control motor 67 in order to return the second eccentric member 68 backwards and thus pull the carriage 66, the portion of flange 63 and the maneuvering rod 60 (here to the left in FIGS. 5 to 8 and 10) so as to return the levers 61 to move the second magnetized plate 46 away from the second receiving surface 22.

The disclosure relates also to a method for manufacturing reinforcing plies 2, 2_left, 2_right including an operation of turning over strips 5 according to the disclosure.

This method advantageously makes it possible to choose, for a given available strip 5, obtained from a cutting performed according to a determined cutting angle, to selectively present said strip 5 for butt-jointing either in a first orientation, corresponding to the orientation obtained straight from the cutting, or in a second orientation, turned over, which is symmetrical to the first orientation and cannot be superposed in shape with the first orientation (because, following the turning over, the apparent bevel angle of the turned-over strip 5 is reversed relative to the apparent bevel angle which results from the original cutting).

More particularly, the disclosure relates to a method for manufacturing reinforcing plies 2, 2_left, 2_right which comprises:

a step (a) of preparation of a strip during which a strip 5 is produced by cutting a band called "straight wire band" 6 which is formed by a plurality of reinforcing wires 7 which are embedded in at least one layer of rubber 8 and which extend parallel to one another in the longitudinal direction Z6 of said straight wire band 6, a butt-jointing step (c) during which said strip 5 is butt-jointed, by one of its selvedges 5R, 5L, to another strip 5 so as to form a reinforcing ply 2, 2_left, 2_right.

According to the disclosure, said method comprises, between the strip preparation step (a) and the butt-jointing step (c), a step (b) of turning over of the strip during which:

the strip 5, which is delimited in thickness by a first face 5_1 and by a second face 5_2 opposite said first face, is placed on a first receiving surface 21 so that said strip rests and is held on said first receiving surface 21 by its second face 5_2, and presents its first face 5_1 as visible face, according to a first orientation, then, the strip 5 is turned over by transferring said strip 5 from the first receiving surface 21 to a second receiving surface 22, so that said strip 5 is held against the second receiving surface 22 by its first face 5_1, and presents its second face 5_2 as visible face, according to a second orientation that is the reverse of the first, the turned-over strip 5 is taken from the second receiving surface 22, in order to transport said turned-over strip to an assembly surface 13 where said strip 5 is butt-jointed in accordance with the second orientation.

It will of course be possible to use a gripping member 26 as described above to detach the turned-over strip 5 from the second receiving surface 22 and convey it to the assembly surface 13.

As has been described above, said gripping member 26 will advantageously be arranged so as to be able to cooperate selectively either with the first receiving surface 21, or with the second receiving surface 22, and do so so as to be able, depending on the orientation desired for the reinforcing ply 2, to take the strip 5 from the receiving surface 21, 22 which corresponds to said desired orientation.

The method will therefore comprise a selective configuration step, in which the receiving surface 21, 22, out of the first receiving surface 21 and the second receiving surface 22, from which said gripping member 26 must take the strip 5, depending on the desired orientation for the reinforcing ply 2 being manufactured, will be specified to the gripping member 26, preferably automatically.

This selective configuration step will preferably also comprise a phase during which the orientation in azimuth of the soleplate 27 of the gripping member 26 will be modified in order to adapt said orientation in azimuth to that of the strip 5 and to the targeted ply angle A2, and more particularly in order to adapt the orientation in azimuth of the soleplate 27 to the sign of the targeted ply angle A2.

Naturally, the disclosure is in no way limited to only the abovementioned variant embodiments, the person skilled in the art being notably able to isolate or freely combine one or other of the features described in the above or replace them with an equivalent.

Thus, for example, it would be possible to replace the electric turning-over motors 35 and/or control motors 51, 67 with pneumatic motors.

Moreover, it will be noted that it will advantageously be possible to use the installation 1 and the method according to the disclosure to perform a so-called "integrated" preparation of reinforcing plies 2, that is to say perform a piecewise preparation of reinforcing plies 2 within a machine for manufacturing pneumatic tires, so that said machine can use said reinforcing plies 2 as and when they are produced by the installation 1, by transferring and directly placing said plies 2 one after the other, as soon as each ply 2 is ready, on a cylindrical crown block building drum or else on a toroidal core whose form corresponds to that of the pneumatic tire 3 to be obtained.

Preferably, for such integrated preparation, on each cycle, there will alternately be produced on the one hand a reinforcing ply with left-hand angle 2_left and on the other hand a reinforcing ply with right-hand angle 2_right, said plies being both intended for one and the same crown block, so that each ply 2_left, 2_right is taken in turn, just after having been made, from the assembly belt 13, to be placed on the building drum or the corresponding toroidal core.

It will also be noted that the installation 1 preferably uses one and the same assembly surface 13, here one and the same assembly belt 13, to successively build, the different types of reinforcing plies 2, namely both the reinforcing plies in accordance with the first orientation, here the left-hand reinforcing plies 2_left, and the reinforcing plies in accordance with the second orientation, namely the right-hand reinforcing plies 2_right.

Advantageously, the same gripping member 26 will be able to take strips 5 either from the first receiving surface 21, or from the second receiving surface 22, depending on the orientation desired for the reinforcing ply 2, and systematically bring these strips 5 onto one and the same assembly surface 13, where said gripping member 26 proceeds with the butt-jointing and thus with the construction of the reinforcing ply 2 according to the chosen orientation.

Such a sharing of one and the same assembly surface 13, and of one and the same gripping member 26, which are involved downstream of the first and second receiving surfaces 21, 22, to interchangeably produce both left-hand reinforcing plies 2_left and right-hand reinforcing plies 2_right, advantageously makes it possible to pool the butt-jointing means and thus use one and the same jointing station 12 that is simple and of little bulk.

More globally, in as much as the installation 1 makes it possible to use, irrespective of the orientation desired for the reinforcing ply 2 to be manufactured, first of all one and the same shared cutter 10, situated upstream of the turning-over station 20, a turning-over station 20 which is itself responsible for orientating the strips 5, then one and the same shared gripping member 26 and one and the same shared assembly surface 13, situated downstream of this same turning-over station 20, in order to butt-joint the strips 5 and thus form said reinforcing ply 2, it is possible to avoid any redundancy of the constituent stations of said installation 1, which considerably limits the bulk thereof.

Moreover, the absence of reconfiguration of the installation 1, or the small scale of the reconfiguration of the installation 1, necessary to switch from a reinforcing ply with left-hand angle 2_left to another reinforcing ply with right-hand angle 2_right makes it possible to rapidly produce each set of plies 2_left, 2_right, typically each set of two plies 2_left, 2_right having ply angles A2 of opposite signs, without penalizing the cycle time of the machine which is responsible for successively taking said plies 2_left, 2_right from the assembly belt 13 to transfer them and superpose them one on top of the other, on the building drum or the toroidal core.

Furthermore, the compactness and the low cost of the installation 1 naturally favour its implementation, for a lesser investment cost, in such integrated preparation processes.

Finally, it will be noted that it would be possible to more generally apply the principle of the turning over according to the disclosure, and notably make use of a reversing device 25, for any type of flat product that can be likened to a strip 5, and do so possibly irrespective of the form or the composition of said flat product or more particularly of said strip.

What is claimed is:

1. An installation for manufacturing a reinforcing ply, said installation comprising:
    a preparation station comprising a cutter configured to prepare strips by repeatedly cutting a straight wire band, wherein the straight wire band comprises a plurality of reinforcing wires embedded in at least one layer of rubber and extending parallel to one another in the longitudinal direction of said straight wire band,
    a jointing station having a surface on which to form the reinforcing ply from the strips obtained from the preparation station,
    said installation further comprising a turnover station for turning over the strips, which is interposed between the preparation station and the jointing station, the turnover station comprising:
    a first receiving surface, arranged to receive one of the strips prepared by the preparation station and to hold said strip prepared by the preparation station in a first orientation in which said strip, which is delimited in thickness by a first face and by a second face opposite said first face, rests and is held on said first receiving surface by its second face, and presents its first face as a visible face, a second receiving surface associated with a reversing device, wherein said reversing device is configured to transfer the strip initially placed and held on the first receiving surface, from said first receiving surface to said second receiving surface, thus turning over the strip so as to confer on said strip a second orientation that is the reverse of the first orientation, wherein in the second orientation said strip is held against the second receiving surface by its first face, and presents its second face as the visible face, and a gripping member configured to take the strips individually and selectively from the first receiving surface or from the second receiving surface in order to selectively construct the reinforcing ply by successively butt-jointing the strips by their selvedges on the surface of the jointing station, wherein the reinforcing ply has one ply angle when formed from strips taken from the first receiving surface and the reinforcing ply has another ply angle when formed from strips taken from the second receiving surface.

2. The installation according to claim 1, wherein the first receiving surface and the second receiving surface are flat.

3. The installation according to claim 1, wherein the first receiving surface is on a first flap and the second receiving surface is on a second flap, wherein said second flap is swiveled relative to said first flap about a turnover axis so as to be able to, alternately, close on the first flap or open by moving away from said first flap.

4. The installation according to claim 3, wherein each of the first and second receiving surfaces has at least one first holding member and at least one second holding member, respectively, each of the at least one first holding member and the at least one second holding member being arranged to, when activated, attract and hold the strip against the respective first or second receiving surface, and wherein a control system activates said at least one first holding member and the at least one second holding member.

5. The installation according to claim 4, wherein the at least one first holding member and/or the at least one second holding member comprises a first and/or second permanent magnet, respectively, in the form of a magnetized plate, wherein the first and/or second permanent magnet is movably mounted on the back of the respective first or second receiving surface, and wherein the control system comprises a maneuvering mechanism arranged to successively move said first and/or second permanent magnet closer to or away from the respective first or second receiving surface in order to modify the magnetic attraction force exerted at said first or second receiving surface with said first and/or second permanent magnet, respectively.

6. The installation according to claim 5, wherein the maneuvering mechanism comprises:

a maneuvering rod associated with the second flap and mounted so as to be movable in translation along a rod axis parallel to the turnover axis, said maneuvering rod being arranged so that the movement along the rod axis controls the moving of the second permanent magnet closer to and away from the second receiving surface, a portion of a circular flange extending at right angles relative to the turnover axis, wherein a horizontal-axis position of said portion of the circular flange along said turnover axis is modifiable by the control system to allow the second flap to swivel relative to the first flap so as to turn over the strip, and a cursor fixed to the end of the maneuvering rod, wherein said cursor is displaceable along said portion of the circular flange to accompany the maneuvering rod and the second flap as the maneuvering rod and the second flap swivel about the turnover axis, wherein said cursor remains engaged with said portion of the circular flange irrespective of the angular position of the second flap relative to the first flap.

7. The installation according to claim 1, wherein the gripping member comprises a soleplate which is configured to be pressed into contact with the visible face of the strip which is present on the first receiving surface or on the second receiving surface, in order to take said strip by its visible face and transfer said strip from the receiving surface that the strip occupies to the joining station.

8. The installation according to claim 1, wherein the gripping member is held by a robotized arm with six axes of movement, and the surface of the joining station is an assembly belt.

9. The installation according to claim 1, wherein the first receiving surface and the second receiving surface each have a length equal to or greater than the length of the strip.

10. The installation according to claim 1, wherein the reversing device comprises a first flap having the first receiving surface and a second flap having the second receiving surface, wherein the second flap is configured to swivel about a turnover axis relative to said first flap to either close on the first flap or open by moving away from said first flap, wherein the first flap also comprises a first holding member arranged to, when activated, attract and hold the strip against the first receiving surface, and the second flap comprises a second holding member arranged to, when activated, attract and hold the strip against the second receiving surface, and wherein a control system activates the first and second holding members in order to facilitate the transfer of the strip from the first receiving surface to the second receiving surface.

11. A method for manufacturing a reinforcing ply comprising:

a strip preparation step (a) of preparing strips by repeatedly cutting a straight wire band at a preparation station, wherein the straight wire band comprises a plurality of reinforcing wires embedded in at least one layer of rubber and extending parallel to one another in the longitudinal direction of said straight wire band, a butt-jointing step (c) of butt-joining the strips by their selvedges to form the reinforcing ply at a joining station, said method comprising, between the strip preparation step (a) and the butt-jointing step (c), a turnover step (b) of turning over the strips at a turnover station, wherein the turnover step (b) comprises:

placing one of the strips, which is delimited in thickness by a first face and by a second face opposite said first face, on a first receiving surface in a first orientation, so that said strip rests and is held on said first receiving surface by its second face, and presents its first face as a visible face, then turning over and transferring said strip from the first receiving surface to a second receiving surface with a reversing device associated with the second receiving surface, so that after transferring, the strip is in a second orientation where said strip is held against the second receiving surface by its first face, and presents its second face as the visible face, and taking the strip from the second receiving surface and positioning the strip at the joining station using a gripping member, wherein the gripping member is configured to selectively transport strips from either the first receiving surface, or the second receiving surface, in order to form the reinforcing ply with one ply angle when using strips transported from the first receiving surface and form the reinforcing ply with another ply angle when using strips transported from the second receiving surface.

\* \* \* \* \*